(12) United States Patent
Kawai

(10) Patent No.: US 11,327,702 B2
(45) Date of Patent: May 10, 2022

(54) INFORMATION PROCESSING APPARATUS, AND CONTROL METHOD

(71) Applicant: CANON KABUSHIKI KAISHA, Tokyo (JP)

(72) Inventor: Ryoya Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/826,502

(22) Filed: Mar. 23, 2020

(65) Prior Publication Data
US 2020/0310728 A1  Oct. 1, 2020

(30) Foreign Application Priority Data

Mar. 29, 2019 (JP) .............................. JP2019-068564

(51) Int. Cl.
| | |
|---|---|
| *G06F 3/12* | (2006.01) |
| *G06F 3/0484* | (2022.01) |
| *G06F 21/31* | (2013.01) |
| *G06F 3/04842* | (2022.01) |

(52) U.S. Cl.
CPC ........ *G06F 3/1286* (2013.01); *G06F 3/04842* (2013.01); *G06F 3/1292* (2013.01); *G06F 21/31* (2013.01)

(58) Field of Classification Search
CPC .. G06F 3/1286; G06F 3/04842; G06F 3/1292; G06F 21/31; G06F 3/1238; G06F 3/1236; G06F 3/1222
See application file for complete search history.

(56) References Cited

U.S. PATENT DOCUMENTS

| | | |
|---|---|---|
| 2009/0103121 A1 | 4/2009 | Kimura |
| 2016/0292553 A1 | 10/2016 | Nagasawa |
| 2017/0286028 A1 | 10/2017 | Yang |
| 2018/0014194 A1* | 1/2018 | Yan .......................... G06F 21/31 |
| 2018/0054536 A1* | 2/2018 | Kadota ................. G06F 3/1292 |
| 2018/0217789 A1* | 8/2018 | Tsuji ..................... G06F 3/1292 |

(Continued)

FOREIGN PATENT DOCUMENTS

JP       2017-182489 A     10/2017

OTHER PUBLICATIONS

Extended European Search Report dated Sep. 9, 2020 in corresponding European Patent Appln. No. 20162723.9.

*Primary Examiner* — Iriana A Cruz
(74) *Attorney, Agent, or Firm* — Venable LLP

(57) ABSTRACT

An information processing apparatus provided with a communication unit can communicate with an external apparatus that provides a predetermined function. The information processing apparatus performs: controlling a screen that is displayed on a display unit; transmitting a request signal for requesting the external apparatus for authentication information; and requesting use of the predetermined function provided by the external apparatus. When the request signal is received by the external apparatus, the external apparatus transitions to a state for accepting a predetermined operation. The information processing apparatus requests for use of the predetermined function based on receiving the authentication information that is output when the predetermined operation is accepted by the external apparatus, while a password input screen corresponding to the predetermined function of the external apparatus is not displayed on the display unit.

18 Claims, 6 Drawing Sheets

(56) References Cited

U.S. PATENT DOCUMENTS

2018/0234561 A1* 8/2018 Kakutani ........... H04N 1/00408
2018/0285029 A1* 10/2018 Yokoyama .............. H04L 63/18
2018/0338234 A1* 11/2018 Tokumoto .............. H04B 17/21

* cited by examiner

INFORMATION PROCESSING APPARATUS, AND CONTROL METHOD

BACKGROUND OF THE INVENTION

Field of the Invention

The present invention relates to an information processing apparatus, and a control method.

Description of the Related Art

Remote UI techniques are known as methods for remotely managing a printing apparatus from an information processing apparatus such as a PC or a mobile terminal. Since the remote UI techniques are methods for remotely managing a printing apparatus, authentication that uses a password is generally required. Japanese Patent Laid-Open No. 2017-182489 discloses a mode for displaying a remote UI for using a function of an MFP (Multi-Function Peripheral) that is a printing apparatus. Japanese Patent Laid-Open No. 2017-182489 describes that authentication processing that uses a password is necessary to use the remote UI, and such authentication processing can be simplified using BLE (Bluetooth Low Energy).

There is demand to be able to reduce a load imposed by authentication processing (for example, password input) when a function of an external apparatus that requires authentication processing (in above case, the remote UI) is used from an information processing apparatus as described above, and for further improving the convenience.

SUMMARY OF THE INVENTION

An aspect of the present invention is to eliminate the above-mentioned problem with conventional technology.

A feature of the present invention is to provide a technique for reducing a load when using, from an information processing apparatus, a function of an external apparatus that requires authentication processing, and further improving the convenience.

One aspect of the present invention provides an information processing apparatus provided with a communication unit that can communicate with an external apparatus that provides a predetermined function, the information processing apparatus comprising: display control unit for controlling a screen that is displayed on a display unit; transmission unit for transmitting a request signal for requesting the external apparatus for authentication information via the communication unit; and requesting unit for requesting use of the predetermined function provided by the external apparatus, via the communication unit, wherein, when the request signal is received by the external apparatus, the external apparatus transitions to a state for accepting a predetermined operation, and the requesting unit requests for use of the predetermined function via the communication unit based on receiving, via the communication unit, the authentication information that is output when the predetermined operation is accepted by the external apparatus, while a password input screen corresponding to the predetermined function of the external apparatus is not displayed on the display unit by the display control unit.

Further features of the present invention will become apparent from the following description of exemplary embodiments (with reference to the attached drawings).

DESCRIPTION OF THE EMBODIMENTS

Figure 1:
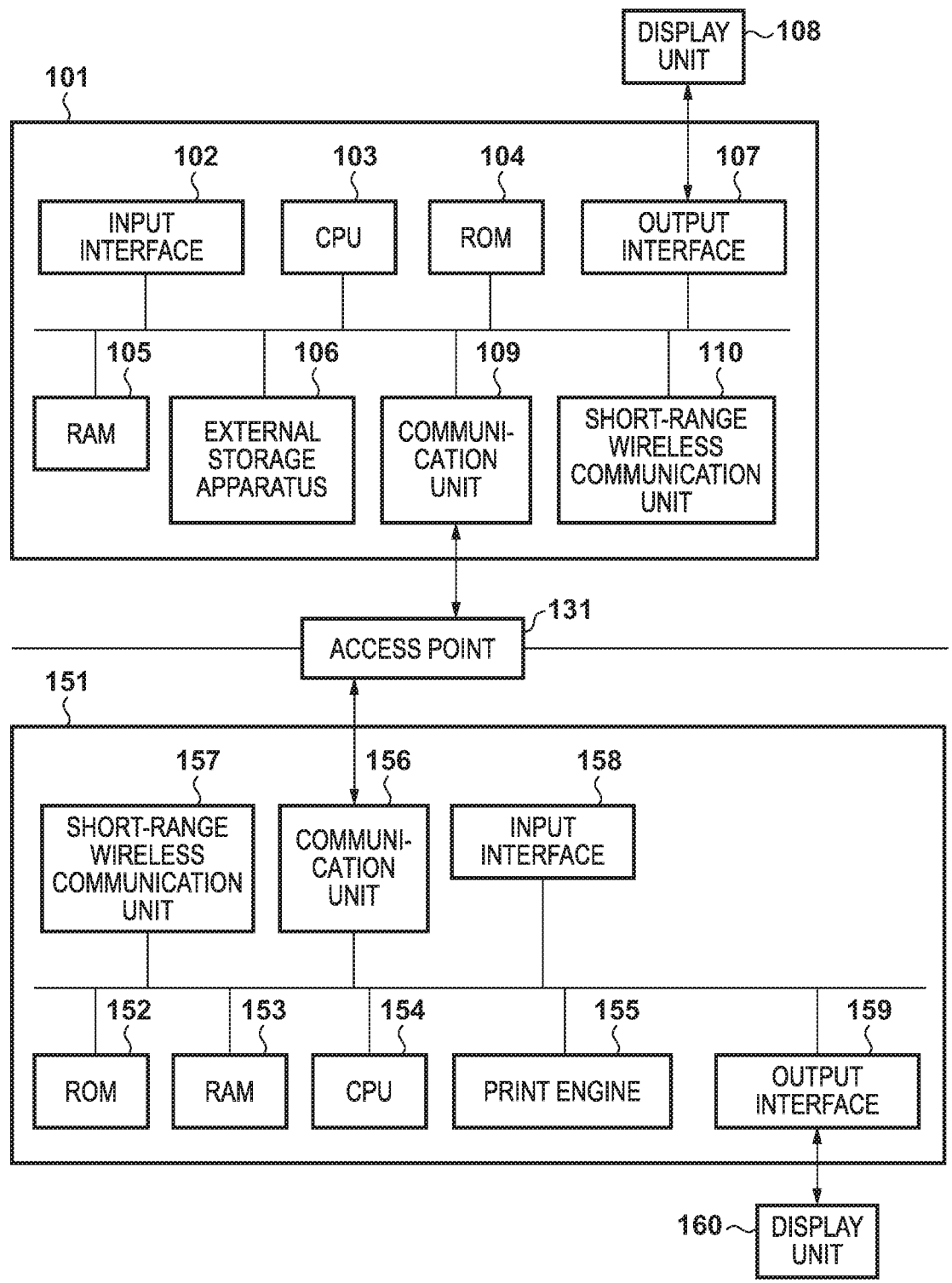
FIG. 1 is a diagram illustrating a configuration example of a communication system according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

A configuration example of an information processing apparatus and a communication apparatus included in a communication system according to this embodiment will be described. In this embodiment, a smartphone is illustrated as the information processing apparatus. However, the information processing apparatus is not limited thereto, and may be another apparatus that can communicate with a communication apparatus such as a mobile terminal, a laptop PC, a tablet terminal, a PDA (Personal Digital Assistant), or a digital camera. In addition, in this embodiment, a printer is illustrated as the communication apparatus, but there is no limitation thereto, and the communication apparatus may be any other apparatus that can communicate with the information processing apparatus. For example, if a printer is used as the communication apparatus, the present invention can be applied to an inkjet printer, a full-color laser beam printer, a monochrome printer, and the like. In addition, the present invention can be applied to not only a printer but also a copier, a facsimile apparatus, a mobile terminal, a smartphone, a laptop PC, a tablet terminal, a PDA, a digital camera, a music reproduction device, a television, and the like. Besides, the present invention can also be applied to an MFP (Multi-Function Peripheral) that has a plurality of functions such as a copy function, a facsimile function, and a print function.

First, a configuration example of an information processing apparatus and a communication apparatus according to this embodiment will be described with reference to FIG. 1. Note that, here, one information processing apparatus, one communication apparatus, and one access point are illustrated, but there is no limitation to this.

In FIG. 1, an information processing apparatus 101 includes an input interface 102, a CPU 103, a ROM 104, a RAM 105, an external storage apparatus 106, an output interface 107, a display unit 108, a communication unit 109, and a short-range wireless communication unit 110. Note that these constituent elements are connected to each other via a system bus.

The input interface 102 is an interface for accepting instructions from the user via an operation unit such as a physical keyboard and a mouse (not illustrated). The CPU 103 is a system control unit, and performs overall control of the information processing apparatus 101 by executing a program or starting hardware. The ROM 104 is a non-volatile storage region, and stores fixed data such as various control programs that are executed by the CPU 103, a data table, and an embedded operating system (OS) program. In this embodiment, the control programs stored in the ROM 104 perform software execution control of scheduling, task switching, interrupt processing, and the like under the management of the embedded operating system stored in the ROM 104.

The RAM 105 is an SRAM (Static Random Access Memory), a DRAM (Dynamic Random Access Memory), or the like. Note that, in this embodiment, the data of the RAM 105 may be retained by using a primary battery for data backup (not illustrated). In that case, the RAM 105 can store important data such as program control variables without volatilizing the data. A memory area for storing setting information, management data, and the like of the information processing apparatus 101 is also provided in the RAM 105. In addition, the RAM 105 is also used as a main memory and a work memory of the CPU 103. The external storage apparatus 106 stores an application that provides a print execution function (hereinafter, "print application"), a program for generating a print job that can be interpreted by a communication apparatus 151, and the like. In addition, the external storage apparatus 106 stores programs for transmitting/receiving, via the communication unit 109, various types of information to/from the connected communication apparatus 151, and various types of information that are used by these programs.

The output interface 107 is an interface for performing display control for the display unit 108 to perform display of data and notification of the state of the information processing apparatus 101. Note that the display unit 108 and the above-described operation unit may be at least partially integrated, and may be, for example, a touch panel that performs screen output and receives an operation from the user, on the same screen. The display unit 108 is constituted by an LED (light emitting diode), an LCD (liquid crystal display), and the like, and performs display of data and notification of the state of the information processing apparatus 101. Note that a configuration may be adopted in which a soft keyboard (not illustrated) that includes keys such as number input keys, mode setting keys, an enter key, a cancel key, and a power key is installed on the display unit 108, and input from the user is accepted via the display unit 108.

The communication unit 109 is connected to an external apparatus such as the communication apparatus 151, and executes data communication. For example, the communication unit 109 can be connected to an access point (not illustrated) constituted by a device provided inside of the communication apparatus 151 or externally attached to the communication apparatus 151. As a result of the communication unit 109 and the access point inside the communication apparatus 151 being connected, the information processing apparatus 101 and the communication apparatus 151 can communicate with each other. Note that the communication unit 109 may communicate with the communication apparatus 151 directly or via an external access point (for example, an access point 131) that is outside of the information processing apparatus 101 and the communication apparatus 151. Examples of a communication method include wireless LAN such as Wi-Fi (Wireless Fidelity) (registered trademark), Bluetooth (registered trademark), and wired LAN (Local Area Network). In addition, examples of the access point 131 include a device such as a router. Note that, in this embodiment, a method in which the information processing apparatus 101 and the communication apparatus 151 are directly connected with each other without an external access point is referred to as a "direct connection method". Also, a method in which the information processing apparatus 101 and the communication apparatus 151 are connected with each other via an external access point is referred to as "infrastructure connection method".

The short-range wireless communication unit 110 has a configuration for being wirelessly connected to an external apparatus such as the communication apparatus 151 at a short distance and executing data communication, and performs communication using a communication method different from that of the communication unit 109. For example, the short-range wireless communication unit 110 can be connected to a short-range wireless communication unit 157 in the communication apparatus 151 at a short distance. Note that, in this embodiment, a description will be given assuming that Bluetooth Low Energy (BLE) is used as the communication method of the short-range wireless communication unit 110. Accordingly, the short-range wireless communication unit 110 has a BLE unit. The BLE unit includes a microcomputer that is a microprocessor that performs wireless communication processing and a wireless communication circuit that transmits/receives data through wireless communication. A RAM and a flash memory are embedded in the microcomputer. Note that, for example, NFC (Near Filed Communication) or Wi-Fi Aware besides BLE may be used as a communication method of the short-range wireless communication unit 110. In addition, a range in which short-range wireless communication is possible changes according to a communication method, but, here, a description will be given assuming that the information processing apparatus 101 and the communication apparatus 151 are positioned in the range. In addition, a description will be given assuming that, in communication between the information processing apparatus 101 and the communication apparatus 151, the performance in communication (the communication speed and data amount) between the communication unit 109 and a communication unit 156 is higher than the performance in communication between the short-range wireless communication unit 110 and the short-range wireless communication unit 157.

The communication apparatus 151 includes a ROM 152, a RAM 153, a CPU 154, a print engine 155, the communication unit 156, the short-range wireless communication unit 157, an input interface 158, an output interface 159, and a display unit 160.

The communication unit 156 includes, as an access point inside the communication apparatus 151, an access point for connecting the communication unit 156 to an external apparatus such as the information processing apparatus 101. Note that the communication unit 156 may directly communicate with the information processing apparatus 101, or may communicate with the information processing apparatus 101 via the access point 131 that is an external access point. Examples of a communication method includes Wi-Fi (registered trademark), Bluetooth (registered trademark), and wired LAN. In addition, the communication unit 156 may also include hardware that functions as an access point, or may also operate as an access point using software that enables the communication unit 156 to function as an access point. The short-range wireless communication unit 157 is a constituent element for wirelessly connecting the communication apparatus 151 to an apparatus such as the information processing apparatus 101 at a short distance. In this embodiment, a description will be given assuming that BLE is used as the communication method of the short-range wireless communication unit 157.

The RAM 153 is constituted by an SRAM, a DRAM, or the like. Note that the data of the RAM 153 may be retained by using a primary battery for data backup (not illustrated). In that case, the RAM 153 can store important data such as program control variables without volatilizing the data. In addition, a memory area for storing setting information, management data, and the like of the communication apparatus 151 is also provided in the RAM 153. In addition, the RAM 153 is also used as a main memory and a work memory of the CPU 154, provides a receive buffer for temporarily storing a print job received from the information processing apparatus 101 or the like, and stores various types of information. The ROM 152 is a non-volatile storage region, and stores fixed data such as control programs that are executed by the CPU 154, a data table, and an OS program. In this embodiment, the control programs stored in the ROM 152 perform software execution control of scheduling, task switching, interrupt processing, and the like under the management of an embedded OS stored in the ROM 152.

The CPU 154 is a system control unit, and performs overall control of the communication apparatus 151 by executing a program or starting hardware. The print engine 155 forms an image onto a recording medium such as paper using a recording agent such as ink based on information recorded in the RAM 153 and a print job received from an external apparatus such as the information processing apparatus 101, and outputs a print result. At this time, the print job transmitted from the information processing apparatus 101 or the like has a large transmission data amount, and there is demand for high-speed communication. Therefore, in this embodiment, a print job is received via the communication unit 156 that can perform communication at a higher speed than the short-range wireless communication unit 157.

Note that a memory such as an external HDD or an SD card may be mounted in the communication apparatus 151 as an option device, and information to be stored in the communication apparatus 151 may be stored in the memory that is the option device. In addition, as an example, processing allocation between the information processing apparatus 101 and the communication apparatus 151 has been illustrated as described above, but there is no particular limitation to such a processing allocation mode, and another mode may also be adopted.

In BLE communication, the short-range wireless communication unit 157 performs communication with a frequency band of 2.4 GHz divided into 40 channels (0 to 39 ch). The short-range wireless communication unit 157 uses three channels, namely the 37 to 39th divided channels for transmitting advertise information and receiving a request to start GATT communication, and uses 37 channels, namely the 0th to 36th channels for data communication after BLE connection.

The input interface 158 is an interface for accepting an instruction from the user via an operation unit such as buttons (not illustrated).

The output interface 159 is an interface for performing display control for the display unit 160 to perform display of data and notification of the state of the communication apparatus 151. Note that the display unit 160 and the above-described operation unit may be at least partially integrated, and may be, for example, a touch panel that performs screen output and receives an operation from the user, on the same screen. The display unit 160 is constituted by an LED (light emitting diode), an LCD (liquid crystal display), and the like, and performs display of data and notification of the state of the communication apparatus 151. Note that a configuration may be adopted in which a soft keyboard (not illustrated) that includes keys such as number input keys, mode setting keys, an enter key, a cancel key, and a power key is installed on the display unit 160, and input from the user is accepted via the display unit 160. In addition, the communication apparatus 151 may include an information bar formed by arranging a plurality of LEDs linearly. The information bar can indicate the state of the communication apparatus 151 based on illumination states of the respective LEDs.

Processing Sequence

Figure 2:
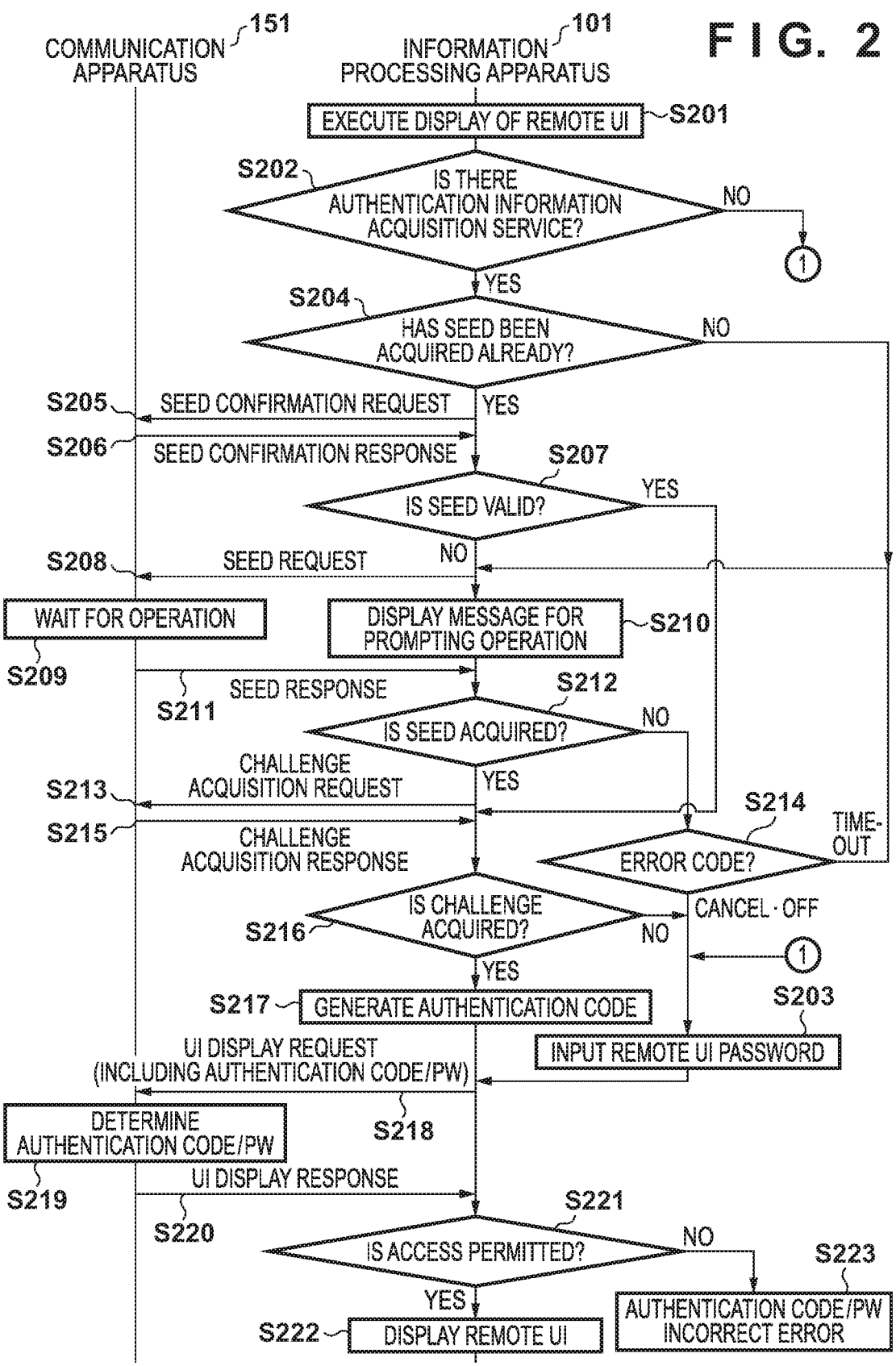
FIG. 2 is a diagram illustrating a processing sequence according to a first embodiment.

FIG. 2 shows a sequence for the information processing apparatus 101 to access a function with access restriction supported by the communication apparatus 151. In this embodiment, a function "remote UI (Remote User Interface)" of a printer will be illustrated as an example of a function with access restriction that the communication apparatus 151 in FIG. 2 has. The remote UI function is a function for managing the communication apparatus 151 using Web browser (not illustrated) of the information processing apparatus 101, and is a service that enables the information processing apparatus 101 to remotely manage the communication apparatus 151. The remote UI has, for example, a function of changing wireless communication information of the printer. Accordingly, if the information processing apparatus changes wireless communication information of the printer using the remote UI, there is the possibility that the printer cannot communicate with an apparatus that the printer can currently communicate with. Therefore, it is necessary to impose access restriction in order to prevent the settings from being changed from any apparatus. The user acquires a password for displaying the remote UI from the communication apparatus 151 in order to use a service of the remote UI, and input the appropriate password in a password input screen of the remote UI that is displayed on the information processing apparatus.

Note that, in this embodiment, the remote UI is described as an example of a function with access restriction, but the present invention is not limited thereto, and can be applied to a function for authenticating printing using a user name, and the like.

The processing sequence according to this embodiment will be described with reference to FIG. 2. Note that the following processes of the processing sequence are realized by the CPUs of the information processing apparatus 101 and the communication apparatus 151 reading out programs stored in the ROMs or the like, and executing the programs, based on the hardware configuration shown in FIG. 1. Furthermore, communication between the apparatuses is performed via the communication units of the apparatuses.

When the user inputs an instruction to display the remote UI, via the screen of the print application in step S201, the information processing apparatus 101 determines, in step S202, whether or not the communication apparatus 151 supports an authentication information acquisition service, based on information of a service list of the communication apparatus 151. The authentication information acquisition service here refers to a service for providing, to the information processing apparatus 101, authentication information (hereinafter, this information is referred to as "seed" or "challenge information") for generating an authentication code when using a function provided by the communication apparatus 151 (for example, a remote UI).

In addition, it is envisioned that the information of the service list has been acquired from the communication apparatus 151 in advance, but the information may be acquired from the communication apparatus 151 after the user inputs an instruction to display the remote UI in step S201. In either case, the information processing apparatus 101 can determine how the communication apparatus 151 supports the authentication information acquisition service, based on the information of the service list acquired from the communication apparatus 151. In addition, in this embodiment, it is envisioned that the information of the service list is acquired from the communication apparatus 151 using Wi-Fi communication, but the information can also be acquired from the communication apparatus 151 using GATT communication of BLE or LAN. Accordingly, a communication method for the information processing apparatus 101 to use a function of the communication apparatus 151 and a communication method for the information processing apparatus 101 to acquire authentication information from the communication apparatus 151 may be different. In addition, there may be a case where a plurality of authentication information acquisition services exist and a corresponding method may be different according to the type of the communication apparatus 151, and, in such a case, the information processing apparatus 101 can determine the corresponding method based on the information of the service list. For example, if there are authentication information acquisition services A and B, the information processing apparatus 101 may determine that the service type is A based on the communication apparatus 151 including an LCD as the display unit 160. Also, the information processing apparatus 101 may determine that the service type is B based on the communication apparatus 151 not including an LCD as the display unit 160. Accordingly, the information processing apparatus 101 can switch the corresponding method for the authentication information acquisition service according to the service type of the communication apparatus 151. If there is no authentication information acquisition service (NO in step S202), the procedure advances to step S203, and if there is an authentication information acquisition service (YES in step S202), the procedure advances to step S204.

In step S202, additional processing such as acquiring an identifier of the communication apparatus 151 through Wi-Fi communication may be performed. For example, determination is made as to whether or not the information processing apparatus 101 and the communication apparatus 151 have undergone BLE pairing already, and if BLE pairing has been performed, the authentication information acquisition service can be executed using BLE communication. On the other hand, if BLE pairing has not been performed, confirmation of an authentication state using Wi-Fi communication to be described in this embodiment is favorable. Note that, even if BLE pairing has been performed, authentication processing through Wi-Fi communication according to this embodiment may be executed without executing the authentication information acquisition service that uses BLE communication. Commonly, the range in which Wi-Fi communication is possible is broader than a range in which BLE communication is possible, and if authentication processing can be executed through Wi-Fi, it is more convenient for the user. In the following description, unless specifically stated otherwise, the information processing apparatus 101 and the communication apparatus 151 communicate with each other using Wi-Fi communication, but this does not limit the range in which the present invention is applied. It suffices for the information processing apparatus 101 and the communication apparatus 151 can communicate with each other in a range broader than a range in which BLE communication is possible, and the present invention can also be applied to communication that uses LAN such as wired LAN.

If the communication apparatus 151 does not provide an authentication information acquisition service (NO in step S202), it is required for the user to input the password of the remote UI. In view of this, the information processing apparatus 101 advances the procedure to step S203, and displays a password input screen (not illustrated) on the display unit 108, and waits until the password is input. If the password is input by the user in step S203, the procedure advances to step S217. On the other hand, if the password is not input by the user, processing for displaying the remote UI is cancelled.

If the communication apparatus 151 provides the authentication information acquisition service (YES in step S202), the information processing apparatus 101 advances the procedure to step S204, and determines whether or not authentication information to be used for authentication between the information processing apparatus 101 and the communication apparatus 151 is included. In this embodiment, determination in step S204 as to whether or not authentication information is included is performed based on whether or not the information processing apparatus 101 has already acquired a seed of the remote UI from the communication apparatus 151 and the information processing apparatus 101 holds the seed. In an example, the information processing apparatus 101 determines whether or not a seed acquired from the communication apparatus 151 in the past is stored in the ROM 152. If a seed has been acquired already, and is held (YES in step S204), the information processing apparatus 101 advances the procedure to step S205 in order to confirm that the seed is valid. On the other hand, if a seed has not been acquired (NO in step S204), the information processing apparatus 101 advances the procedure to step S208.

In step S205, the information processing apparatus 101 transmits a seed confirmation request in order to determine the validity of the seed held therein. The seed confirmation request may be any information generated based on the seed. In an example, in step S205, the information processing apparatus 101 transmits the seed held therein as a seed confirmation request to the communication apparatus 151. Upon receiving the seed confirmation request from the information processing apparatus 101 in step S205, the communication apparatus 151 executes processing for determining the validity of the seed, and transmits a seed confirmation response signal that includes the determination result to the information processing apparatus 101 in step S206.

The information processing apparatus 101 that has received the seed confirmation response signal from the communication apparatus 151 in step S206 advances the procedure to step S207, and confirms whether or not the communication apparatus 151 determined that the seed is valid, based on the seed confirmation response signal. If the information processing apparatus 101 determines that a response signal indicating that the seed is valid has been received (YES in step S207), the information processing apparatus 101 includes authentication information corresponding to the communication apparatus 151. Accordingly, the information processing apparatus 101 determines that it is possible to continue the authentication processing, and advances the procedure to step S213. If the information processing apparatus 101 determines that a response signal indicating that the seed is not valid has been received (NO in step S207), the information processing apparatus 101 does not include authentication information that is valid for the communication apparatus 151. Therefore, the information processing apparatus 101 determines that authentication processing cannot be continued in this state, and advances the procedure to step S208. Note that examples of a case where a seed is invalidated include a case where the information processing apparatus 101 acquires a seed from the communication apparatus 151, and the communication apparatus 151 then changes the seed to a new seed. For example, if reset of a wireless communication function is selected via an operation panel of the communication apparatus 151, the communication apparatus 151 generates a new seed. In this case, the seed before being changed that is held by the information processing apparatus 101 and the changed seed that is held by the communication apparatus 151 are different, and thus determination may be NO in step S207.

In step S208, the information processing apparatus 101 transmits an authentication information request to the communication apparatus 151 in order to acquire authentication information from the communication apparatus 151. In this embodiment, the information processing apparatus 101 transmits a seed request (request signal) to the communication apparatus 151 in step S208. The communication apparatus 151 that received the seed request from the information processing apparatus 101 in step S208 advances the procedure to step S209, and waits for a user's operation.

Figure 3:
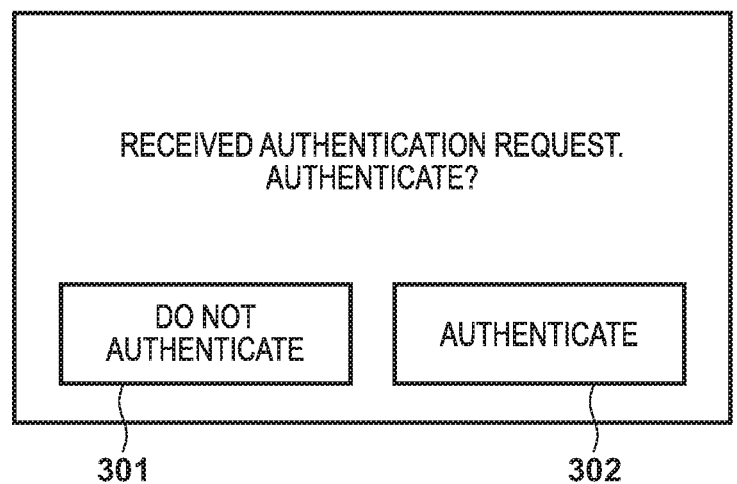
FIG. 3 is a diagram illustrating a configuration example of a screen of a communication apparatus according to the present invention.
Figure 4A:
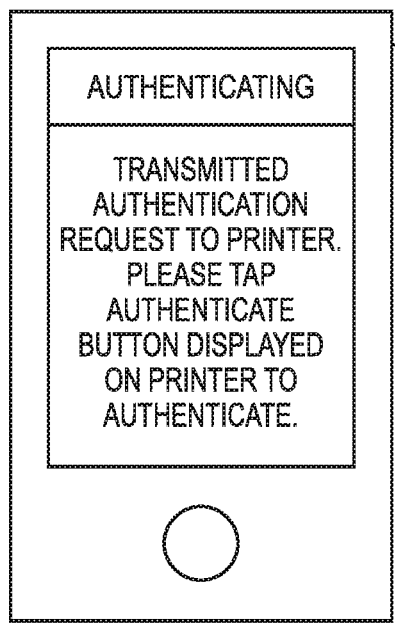
FIGS. 4A and 4B are diagrams illustrating a configuration example of a screen of an information processing apparatus according to the present invention.
Figure 4B:
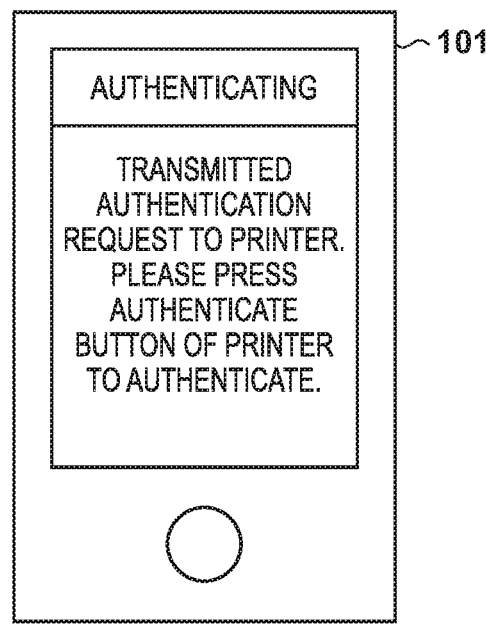

For example, if the communication apparatus 151 includes an LCD as the display unit 160, the communication apparatus 151 can display, on the LCD, a message for inquiring whether or not to transmit authentication information to the information processing apparatus 101. FIG. 3 shows an example of the message that is displayed on the LCD. A dialogue as shown in FIG. 3 is displayed on the LCD, and if the user taps on a "do not authenticate" button (object) 301, the authentication information is not transmitted, and if the user taps on an "authenticate" button (object) 302, the authentication information is transmitted. In addition, if the communication apparatus 151 does not have an LCD as the display unit 160, the communication apparatus 151 waits until the user performs an operation of selecting a button for permitting transmission of authentication information. The button for permitting transmission of authentication information may be a button dedicated to authentication, or a button for another function may also be used as the button for permitting transmission of authentication information. After transmitting the request for authentication information in step S208, the information processing apparatus 101 advances the procedure to step S210, displays, on the display unit 108 of the information processing apparatus 101, a message indicating that a user's operation on the communication apparatus 151 is required. For example, if the communication apparatus 151 includes an LCD as the display unit 160, in other words if the service type of the authentication information acquisition service is the service type A, the information processing apparatus 101 displays, on the display unit 108, a message for prompting an operation on the LCD of the communication apparatus 151. In addition, if the communication apparatus 151 does not have an LCD as the display unit 160, the information processing apparatus 101 displays, on the display unit 108, a message for prompting an operation on the button for permitting transmission of authentication information. Note that a case where the communication apparatus 151 does not include an LCD is equivalent to a case where the service type of authentication information acquisition service is the service type B. FIGS. 4A and 4B show an example of a message displayed by the information processing apparatus 101. FIG. 4A shows a message when the communication apparatus 151 includes an LCD as the display unit 160. In this case, an operation on an authentication button displayed on the LCD of the communication apparatus 151 is prompted. FIG. 4B shows a message when the communication apparatus 151 does not include an LCD as the display unit 160. In this case, an operation on an authentication button in the communication apparatus 151 is prompted. In addition, if the communication apparatus 151 includes an information bar as the display unit 160, it is possible to notify the user that an operation needs to be performed on the communication apparatus 151, by illuminating the information bar. According to the message on the display unit 108 of the information processing apparatus 101 in step S210, in the case of the communication apparatus 151 that includes an LCD, the user selects an object indicating "permitted" displayed on the LCD of the communication apparatus 151 or an object indicating "not permitted". On the other hand, in the case of the communication apparatus 151 that does not include an LCD, the user performs an operation on the above-mentioned button for permitting transmission of authentication information. If the user performs an operation on a display of the LCD or a button for transmitting authentication information, or an operation has not been performed for a predetermined time, the procedure advances to step S211.

In step S211, the information processing apparatus 101 acquires a response signal from the communication apparatus 151 in response to the seed request, and, in step S212, confirms the content of the response signal. If the user performs an operation (select operation) on the object (or button) 302 for permitting transmission of authentication information displayed on the LCD of the communication apparatus 151, the communication apparatus 151 determines that authentication information needs to be transmitted. Therefore, in step S211, the information processing apparatus 101 acquires a response signal that includes a valid seed from the communication apparatus 151, as a response to the signal for requesting authentication information, and advances the procedure to step S212.

If the communication apparatus 151 determines that selection of the object 301 indicating "not permitted" and displayed on the LCD has been detected, or an operation has not been performed on the button for a predetermined time, the communication apparatus 151 performs determination to not transmit authentication information to the information processing apparatus 101. Therefore, in step S211, the information processing apparatus 101 acquires a response that includes error information as a response to the seed request, from the communication apparatus 151, and advances the procedure to step S212. In an example, the error information includes information indicating that an operation has been performed on the object 301 indicating that transmission of authentication information is not permitted (CANCEL). Alternatively, the error information includes information indicating that an operation has not been performed on the button for permitting transmission of authentication information of the communication apparatus 151 (TIMEOUT).

In step S212, the information processing apparatus 101 determines whether or not authentication information could be acquired, based on the response signal received in step S211. If it is determined that authentication information could be acquired (YES in step S212), the information processing apparatus 101 advances the procedure to step S213, and if it is determined that authentication information could not be acquired (NO in step S212), advances the procedure to step S214. Also at this time, if the communication apparatus 151 includes an information bar as the display unit 160, the user may be notified that whether acquisition of authentication information was successful or failed, by illuminating the information bar. Accordingly, if the information processing apparatus 101 transmits information indicating that acquisition was successful, to the communication apparatus 151, the communication apparatus 151 performs light emission processing for indicating that acquisition was successful, using the information bar. For example, a plurality of light emitters (for example, LEDs) constituting the information bar are all illuminated in white. On the other hand, if the information processing apparatus 101 transmits, to the communication apparatus 151, information indicating that acquisition failed, the communication apparatus 151 performs light emission processing for indicating that acquisition failed, using the information bar. For example, one light emitter (LED) that constitutes the information bar is illuminated in red.

In step S214, the information processing apparatus 101 performs determination on the error information. Determination on the error information may be performed according to whether or not the seed acquired from the communication apparatus 151 is valid, or may also be performed based on the error information acquired from the communication apparatus 151. In step S214, three types, namely the user not permitting the authentication information transmission request (cancel), the communication apparatus 151 not responding the authentication information transmission request (off), and no operation performed for a predetermined time or longer (timeout) are envisioned as error codes. If transmission of authentication information is not permitted, in other words authentication processing is canceled by the user (CANCEL in step S214), the information processing apparatus 101 advances the procedure to step S203. Alternatively, if a response to a seed request is set to "invalid" in the communication apparatus 151 (OFF in step S214), the information processing apparatus 101 advances the procedure to step S203. In step S203, the information processing apparatus 101 displays a password input screen (not illustrated), and waits until a password is input. At this time, authentication processing may be continued using BLE communication without displaying the password input screen. Note that, in this embodiment, when authentication processing is continued using BLE, a user's operation is not required on the communication apparatus 151 side. In addition, if selection of a display of the LCD or an operation on a button for transmitting authentication information has not been performed for a predetermined time (TIMEOUT in step S214), the information processing apparatus 101 returns the procedure to step S208, and repeats the seed request. In an example, if timeout occurs a predetermined number of times due to a select operation having not been performed on the object of the LCD or the button for transmitting authentication information for a predetermined time, the information processing apparatus 101 advances the procedure to step S203.

Then, the information processing apparatus 101 may display the password input screen and prompt the user to input a password. At this time, a configuration may be adopted in which authentication processing is executed using BLE communication without displaying the password input screen.

In step S213, the information processing apparatus 101 transmits, to the communication apparatus 151, a signal for requesting acquisition of challenge information, and advances the procedure to step S215. The challenge information is a random number sequence required for authentication processing, and is information that is used one time. Accordingly, the challenge information is changed for every challenge request for acquiring challenge information and transmitted in response to the challenge request.

In step S215, the information processing apparatus 101 receives challenge information in response to the request for acquiring challenge information, from the communication apparatus 151. If challenge information could be acquired properly in response to the request for acquiring challenge information, the information processing apparatus 101 advances the procedure to step S216, and if challenge information could not be acquired, advances the procedure to step S203. The information processing apparatus 101 then displays a password input screen, and waits until a password is input. At this time, authentication processing may be executed using BLE communication without displaying the password input screen. Note that examples of "the case where challenge cannot be acquired normally" includes a case where Wi-Fi communication is disconnected at this timing.

In step S216, the information processing apparatus 101 generates an authentication code for accessing the remote UI. In this embodiment, an authentication code is generated using the seed acquired in step S211, the challenge information acquired in step S215, and fixed hash values held by the print application in advance. After generating the authentication code, the information processing apparatus 101 advances the procedure to step S217

In step S217, the information processing apparatus 101 transmits a request to display the remote UI, to the communication apparatus 151. The request here includes the authentication code generated in step S216 or the password input by the user in step S203, and is transmitted. In step S218, the communication apparatus 151 determines whether or not the authentication code or password included in the request received from the information processing apparatus 101 is correct.

In step S219, the communication apparatus 151 transmits the determination result in step S218 in response to the request to display the remote UI, to the information processing apparatus 101. In the response here, if the authentication code or password is correct, authentication is successful, and a response indicating that access to the remote UI is permitted is given, and if the authentication code or password is incorrect, a value of an error (authentication failure) is returned. Note that, when access is permitted, the communication apparatus 151 may transmit screen information related to the remote UI such as the URL of the remote UI additionally. In addition, the response indicating that access to the remote UI is permitted may be the URL of the remote UI itself. At the same time, if the communication apparatus 151 includes an information bar as the display unit 160, it is possible to notify, by illuminating the information bar, the user of whether authentication was successful or failed (in other words, the determination result in step S218).

In step S220, the information processing apparatus 101 confirms the content of the response transmitted from the communication apparatus 151, and determines whether or not a response indicating that access is permitted has been obtained, in other words whether or not authentication processing was successful. If access is permitted (YES in step S220), the information processing apparatus 101 advances the procedure to step S221, and if an error is returned (NO in step S220), advances the procedure to step S222.

In step S222, the information processing apparatus 101 presents an error of the authentication code or password being incorrect (authentication failure), to the user via Web browser or the like, and waits for the next processing.

Figure 5A:
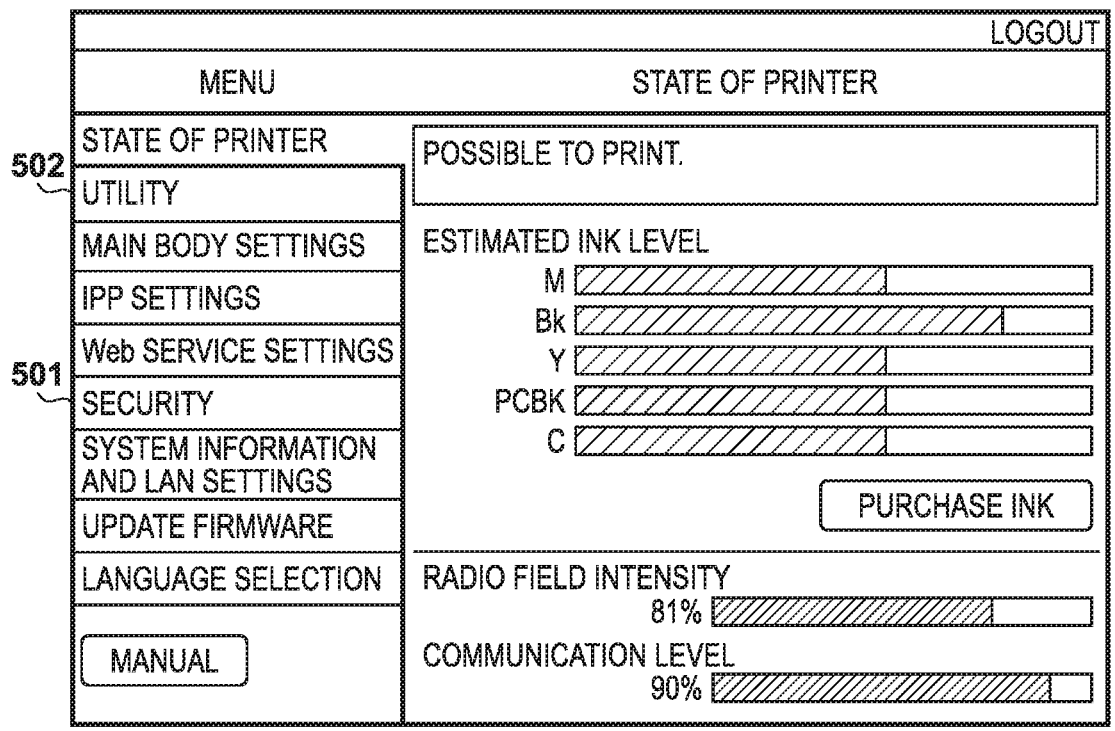
FIGS. 5A and 5B are diagrams illustrating a configuration example of a remote UI.
Figure 5B:
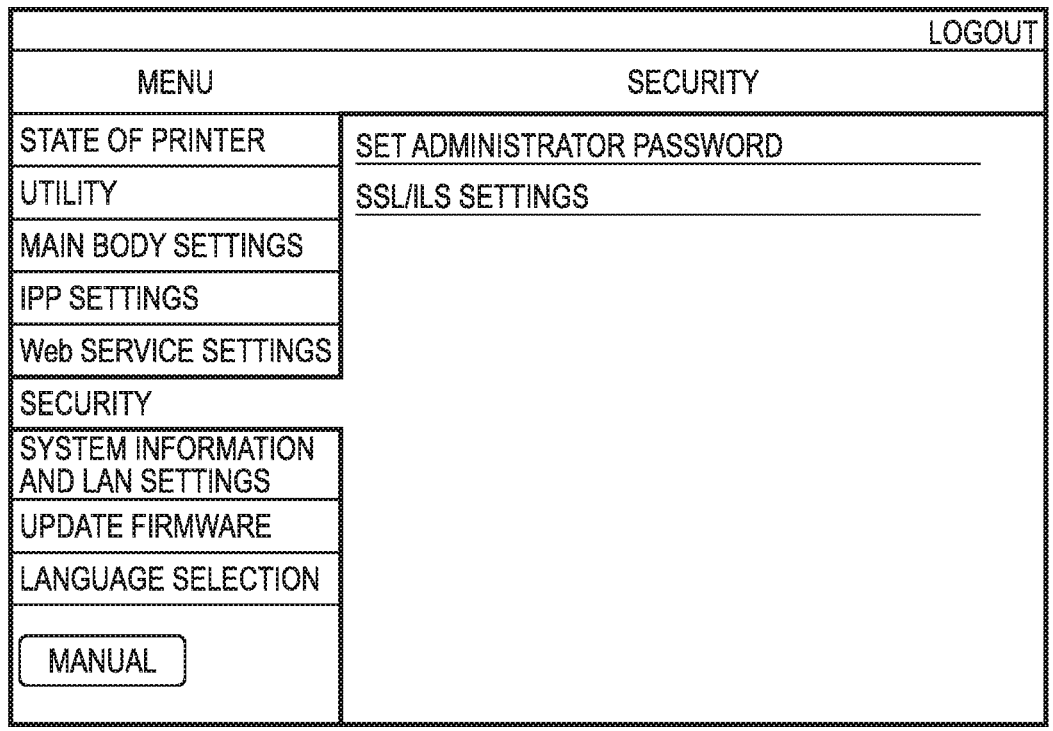

In step S221, the information processing apparatus 101 displays the remote UI. FIGS. 5A and 5B show an example of a screen configuration of the remote UI. In the remote UI shown in FIGS. 5A and 5B, a screen for confirming various types of information related to a printer that is the communication apparatus 151 (management screen) is displayed. FIG. 5A shows the state of the printer (an ink level, radio field intensity, and a communication level) and the like. Here, when a security button 501 displayed in FIG. 5A is selected, the display screen transitions to a security screen shown in FIG. 5B. In the security screen, information related to the security of the printer is shown. Similarly, in FIG. 5A, if a utility button 501 is selected, a menu of maintenance of the printer (not illustrated) is displayed. Note that, in this embodiment, the authentication code generated in S126 and the password input in step S203 are different, but may be the same.

As described above, in this embodiment, when the information processing apparatus 101 accesses a function with access restriction that the communication apparatus 151 has, whether or not the communication apparatus 151 provides an authentication information acquisition service is confirmed. Then, if the communication apparatus 151 provides an authentication information acquisition service, the information processing apparatus 101 requests the communication apparatus 151 for authentication information. The information processing apparatus 101 acquires authentication information according to an operation on the communication apparatus 151, and can thereby execute authentication processing based on the authentication information. Accordingly, the user can use the function with access restriction that the communication apparatus 151 has, by performing an easy operation.

In addition, there are cases where authentication performed through Wi-Fi communication for the information processing apparatus 101 to access a function with access restriction (for example, the remote UI) is not complete, or authentication information is expired. Even in this case, when the user instructs execution of the remote UI via the print application, the information processing apparatus 101 starts authentication processing through Wi-Fi communication. The information processing apparatus 101 then acquires a seed and challenge information from the communication apparatus 151 according to permission of transmission of authentication information, generates an authentication code using the acquired seed and challenge information, transmits the authentication code to the communication apparatus 151. The remote UI is thereby automatically displayed in the information processing apparatus 101. Accordingly, according to this embodiment, the information processing apparatus 101 can perform authentication processing based on the acquired authentication information according to an operation on the communication apparatus 151, and thus it is possible to reduce a load when using a function of the communication apparatus, and improve the convenience.

In addition, if the information processing apparatus 101 performs authentication processing on the communication apparatus 151 using the above-described seed and challenge information, it is obvious that the communication apparatus 151 provides an authentication information acquisition service. Therefore, when the information processing apparatus 101 performs authentication processing on the communication apparatus 151 using the above-described seed and challenge information once, and then accepts an instruction to execute display of the remote UI again, the service list of the communication apparatus 151 does not need to be acquired. Therefore, the information processing apparatus 101 may skip the process in step S202. In addition, in this case, the seed or password can be acquired through authentication information acquisition service, and the password does not need to be input by the user of the information processing apparatus 101, and thus the process in step S203 is not necessary.

The above-described processing makes it possible to improve the convenience when a function of an apparatus that requires authentication processing is used, since display control is performed so as to not display an unnecessary authentication screen. In addition, by executing authentication processing through Wi-Fi communication, authentication can be performed in a broader range than that of authentication processing that uses BLE, improving the convenience for the user. In addition, according to this embodiment, communication of authentication information is performed through Wi-Fi communication, and display information of the remote UI is also acquired though Wi-Fi communication. Accordingly, the communication unit 109 is used for communication of authentication information and acquisition of display information of the remote UI. Therefore, switching of a communication method is not necessary, and the convenience can be improved.

Note that, in this embodiment, description has been given assuming that the function with access restriction is a function of displaying a management screen, but the function with access restriction may be a management function of instructing execution of a predetermined function (remote operation function). For example, also when the communication apparatus 151 is remotely operated, this embodiment can be applied. As an example of a remote operation, if the communication apparatus 151 has a copy function, a management function of the information processing apparatus 101 executing copy of the communication apparatus 151 is conceivable (hereinafter, remote copy). In an example, in order to prevent remote copy from being inadvertently executed, authentication processing needs to be performed in advance. Also in such a case, by acquiring authentication information using Wi-Fi communication, the communication apparatus 151 can acquire permission of access to the remote copy function, and performs display control so as to not display a password input screen. Accordingly, the user can execute the remote copy function in the communication range of Wi-Fi communication without inputting a password. Note that an instruction to execute remote copy is transmitted from the information processing apparatus 101 to the communication apparatus 151 through Wi-Fi communication. Specifically, according to this embodiment, communication of authentication information is performed through Wi-Fi communication, and an instruction of remote copy is transmitted through Wi-Fi communication. Therefore, switching of a communication method is unnecessary, and the convenience can be improved.

Timing of Authentication Processing

In this embodiment, authentication processing is executed at the timing when the display screen transitions to a specific screen of the print application that provides a print execution function. Note that authentication processing of this embodiment refers to a series of processes in FIG. 2, but steps S221 and S222 may change according to a user's operation. First, a screen of the application will be described. Note that a description will be given in which the communication apparatus 151 is referred to as a "printer that has a print function".

First, the information processing apparatus 101 is instructed to start the print application, by the user via the input interface 102. The information processing apparatus 101 starts the print application.

Figure 6A:
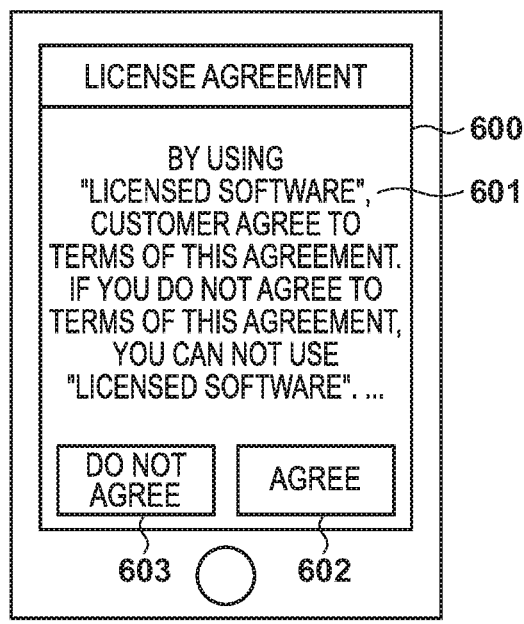
FIGS. 6A to 6F are diagrams illustrating an example of screen transition according to the present invention.

FIGS. 6A to 6F show screen transition of the print application displayed to the user via the display unit 108 of the information processing apparatus 101. A license agreement screen 600 shown in FIG. 6A is a screen for the user to confirm conditions to comply with when the print application is used, and the like. The user confirms the content of a license agreement wording 601, and selects whether or not to agree with the license agreement. If the license agreement is not agreed upon, the print application ends by the user selecting a button 603. If the license agreement is agreed upon, the display screen of the print application transitions to a main screen 604 shown in FIG. 6B as a result of the user selecting a button 602. Note that, if authentication processing has not been executed, the information processing apparatus 101 executes authentication processing at the timing when, in the print application, a predetermined button for using a function with access restriction is pressed. Examples of the predetermined button include an image print button 605, a document print button 606, a remote UI display button 607, and a remote copy button 608 in FIG. 6B. Besides, the predetermined button may be a print setting button 616 in FIG. 6D, and authentication processing is started at the timing when the user performs an operation on a button for using a function with access restriction.

The main screen 604 displays main functions of the print application in a list. If data to be printed is image data stored in the external storage apparatus 106 of the information processing apparatus 101, or the like, the user selects the image print button 605. If the image print button 605 is selected, the display screen transitions to an image select screen 613 shown in FIG. 6D. If data to be printed is document data, the user selects the document print button 606. If the document print button 606 is selected, the display screen transitions to a document select screen (not illustrated). In addition, if the user desires to display the remote UI, the remote UI display button 607 is selected. When the remote UI display button 607 is selected, the display screen transitions to the remote UI screen as shown in FIGS. 5A and 5B.

The print application can register specific information, function information, and the like of a printer in order to specify the printer in a network. Here, examples of specific information for specifying a printer include identification information (MAC address) of the printer, an IP address, and the name of the printer. In addition, examples of function information of a printer include information regarding the performance of the printer such as a list of types of printable paper and the presence or absence of a double-sided print function. As a result of the print application performing processing for registering this specific information and function information, these pieces of information are stored in association with each other in the external storage apparatus 106. A printer with respect to which such registration processing has been executed is referred to as "registered printer", and a printer that executes print processing is referred to as "current printer". Note that, in this embodiment, it is also possible to register a plurality of printers although a description thereof is omitted. In that case, the user selects a current printer from among a plurality of registered printers before executing print processing. Of course, if the number of registered printers is one, the one printer is used as a current printer.

Figure 6B:
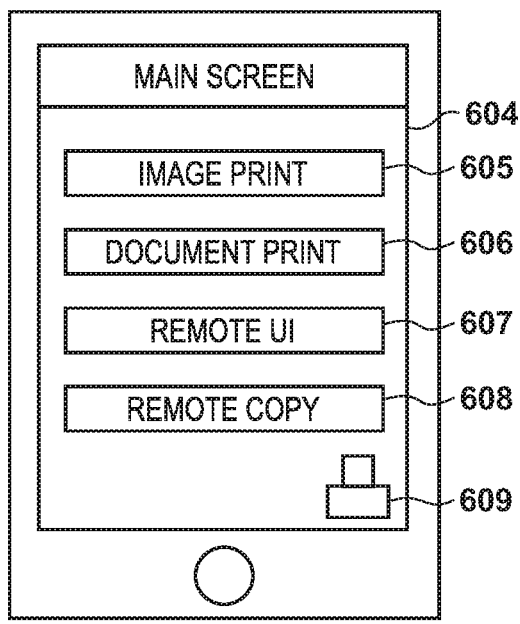
Figure 6C:
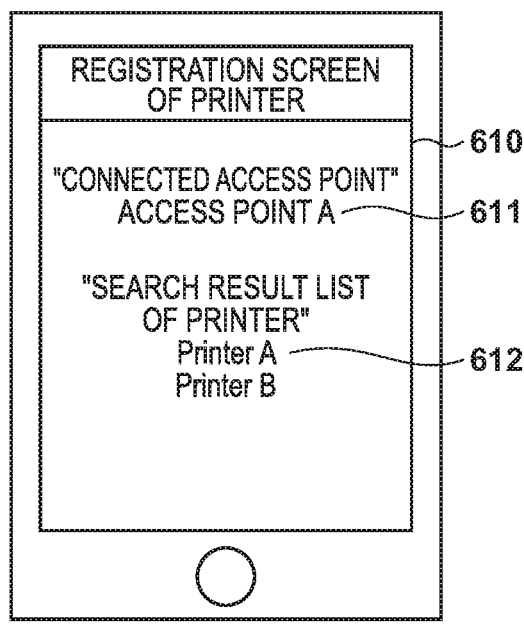

When registering a printer, the user selects a printer registering button 609 provided in the main screen 604 shown in FIG. 6B. When the printer registering button 609 is selected, the display screen transitions to a printer registration screen 610 shown in FIG. 6C. When the display screen transitions to the printer registration screen 610, the print application executes processing for searching for a printer connected in the network to which the information processing apparatus 101 is connected. After that, the print application displays retrieved printers in a list. Here, the names of the printers included in the specific information are displayed. As a result of the user selecting a printer desired to be registered from among a group of printers listed in the printer registration screen 610, a registered printer is determined. It is also possible to select a plurality of registered printers.

SSID (Service Set Identifier) of the access point 131 to which the information processing apparatus is currently connected is displayed as an access point name 611 in the printer registration screen 610. Here, for simplification, the access point name is "access point A". The result of printer search is displayed in a search result list 612. In the example in FIG. 6C, two retrieved printers (here, "printer A" and "printer B") are displayed. In other words, the "printer A" and the "printer B" are connected to the access point A. As a result of the user selecting a listed printer and inputting a registration instruction, the print application registers the selected printer as a registered printer. Note that, when registration processing of the printers is complete, the display screen transitions to the main screen 604. Note that in this embodiment, only one printer can be registered as a registered printer, and the selected printer becomes a current printer. For example, if a printer A612 is selected, this become a current printer. In addition, if a plurality of printers are selected, a current printer may be determined based on the selected order.

Figure 6D:
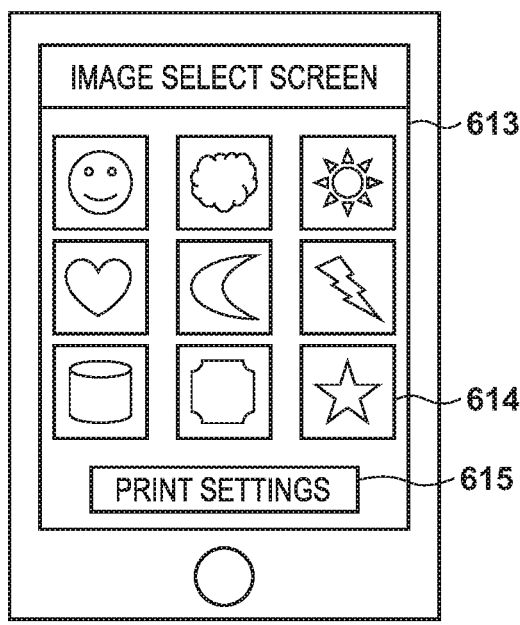
Figure 6E:
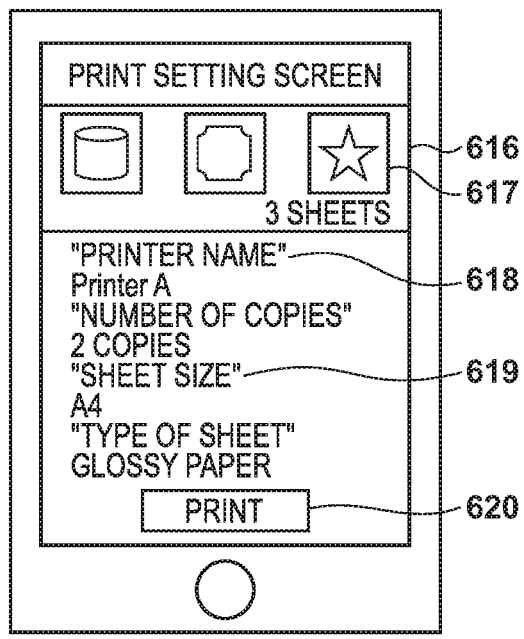
Figure 6F:
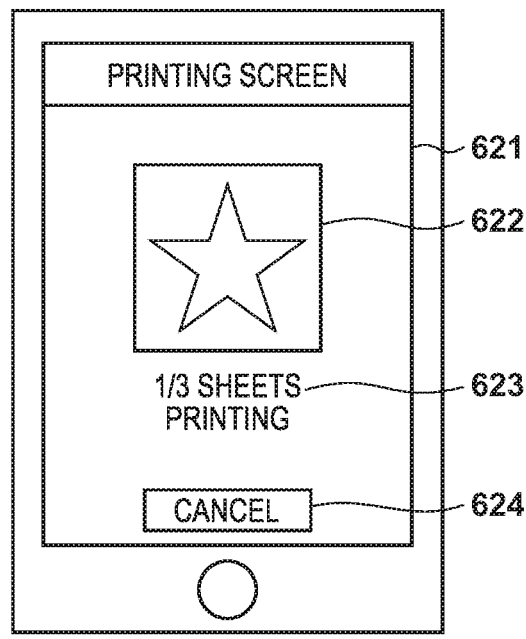

When the image print button 605 is selected on the main screen 604, the display screen transitions to an image select screen 613 shown in FIG. 6D. Thumbnail images of image data stored in the external storage apparatus 106 of the information processing apparatus 101 are displayed on the image select screen 613, and the user can select an image to be printed by selecting a thumbnail image. A check mark 614 that indicates a print target is displayed on the thumbnail of the image selected as an image to be printed. When the user selects an image and selects a print setting button 615, the display screen transitions to a print setting screen 616 shown in FIG. 6E.

The thumbnail of the image to be printed that has been selected on the image select screen 613 is displayed in a thumbnail display region 617 of the print setting screen 616. The printer name of the current printer is displayed in a printer name display region 618. As a printer name, a name included in the specific information of the communication apparatus stored in association with the current printer is displayed. Note that, if there are a plurality of registered printers, the name of a registered printer selected by the user via a printer select screen (not illustrated) or the like is displayed as the current printer. Print conditions when executing print is displayed on a print condition display region 619. The user can as appropriate change the print conditions on a print condition change screen (not illustrated), for example. When instructing the print application to start printing, the user selects a print button 620. Accordingly, a print operation is started, and the display screen transitions to a "printing" screen 621 shown in FIG. 6F.

When the "printing" screen 621 is displayed, the print application transmits, to the current printer (here, the printer A), an instruction to print the image to be printed that has been selected by the user, under the print conditions displayed in the print condition display region. In a "printing" image 622 that is displayed in the "printing" screen 621, an image that is currently being printed by the printer from among images to be printed is displayed, and the progress and status of printing are displayed in a message 623. For example, when printing cannot be continued or is stopped due to a certain problem having occurred when an image was being printed, such a situation is displayed in the message 623 in order to notify the user of the situation. If a cancel button 624 is selected by the user, printing is stopped, and the display screen transitions to the print setting screen 616 that is a previous screen. Note that, if the cancel button 624 is selected, a message indicating that the cancel button 624 has been selected, and information regarding images that have/have not been printed may be displayed. In addition, the display screen may transition to the main screen 604.

Other Embodiments

In the above-described embodiment, in step S214, an example has been described in which, if it is determined that the status is CANCEL or OFF, authentication processing that uses BLE is continued, but authentication processing may also be performed in different order. Specifically, when BLE pairing processing is complete, the information processing apparatus 101 can generate an authentication code for accessing the remote UI without any user's operation performed on the communication apparatus 151 as shown in FIG. 3. Therefore, the information processing apparatus 101 determines whether or not BLE pairing processing on the communication apparatus 151 has completed. Then, if the processing has completed, the information processing apparatus 101 acquires authentication information from the communication apparatus 151 using BLE, and generates an authentication code. Then, the information processing apparatus 101 may transmit a request to display the remote UI (including the authentication code) to the communication apparatus 151 using Wi-Fi communication. Here, a configuration may also be adopted in which, after it is determined that BLE paring has not completed, or, if authentication processing performed through BLE failed, the information processing apparatus 101 starts the processing in FIG. 2.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068564, filed Mar. 29, 2019, which is hereby incorporated by reference herein in its entirety.

What is claimed is:

1. An information processing apparatus provided with a communication unit that can communicate with a printing apparatus that provides a predetermined function, the information processing apparatus comprising:
   one or more processors; and
   one or more memories storing instructions that, when executed by the one or more processors, cause the information processing apparatus to:
   transmit a request signal for requesting authentication information to the printing apparatus via the communication unit;
   receive the authentication information via the communication unit;
   in a case where the authentication information is received, generate an authentication code based on the authentication information;
   request use of the predetermined function provided by the printing apparatus using the authentication code, via the communication unit without accepting the authentication code for the use of the predetermined function from a user;
   generate a print job used for printing executed by the printing apparatus; and
   transmit the print job to the printing apparatus via the communication unit that is used to transmit the request signal and that is used to receive the authentication information.

2. The information processing apparatus according to claim 1,
   wherein, a screen for prompting the predetermined operation in the printing apparatus is displayed, in response to transmission of the request signal.

3. The information processing apparatus according to claim 2,
   wherein a first screen is displayed when prompting a first predetermined operation, and a second screen different from the first screen is displayed when prompting a second predetermined operation different from the first predetermined operation.

4. The information processing apparatus according to claim 1,
wherein the printing apparatus includes a display unit for displaying a screen, and
the predetermined operation is an operation of selecting an object displayed on the display unit.

5. The information processing apparatus according to claim 1,
wherein the printing apparatus includes a button for accepting the predetermined operation, and
the predetermined operation is an operation of pressing the button.

6. The information processing apparatus according to claim 1,
wherein the predetermined function is a remote UI function for displaying a management screen for managing the printing apparatus,
information regarding the management screen is received via the communication unit by requesting use of the remote UI, and
the management screen is displayed based on the information regarding the management screen.

7. The information processing apparatus according to claim 1,
wherein the predetermined function is a remote copy function of the information processing apparatus instructing a copy function of the printing apparatus, and
an instruction to execute the remote copy function is transmitted to the printing apparatus via the communication unit by requesting use of the remote copy function.

8. The information processing apparatus according to claim 1,
wherein the one or more memories further store instructions that, when executed by the one or more processors, cause the information processing apparatus to:
acquire other authentication information via the communication unit in a case where the authentication information was received,
wherein use of the predetermined function is requested using the authentication code generated based on the authentication information and the other authentication information, and
the printing apparatus permits execution of the predetermined function based on the requesting unit requesting use of the predetermined function.

9. The information processing apparatus according to claim 8,
wherein, when at least one of the authentication information and the other authentication information was not acquired, the password input screen is displayed.

10. The information processing apparatus according to claim 1,
wherein the one or more memories further store instructions that, when executed by the one or more processors, cause the information processing apparatus to:
determine whether or not the authentication information is already stored; and
confirm validity of the authentication information if the determination unit determines that the authentication information is stored already,
wherein, if the authentication information is not valid, the request signal is transmitted.

11. The information processing apparatus according to claim 1,
wherein communication performed by the communication unit is communication based on Wi-Fi.

12. A control method implemented by at least one processor of an information processing apparatus provided with a communication unit that can communicate with a printing apparatus that provides a predetermined function, the method comprising:
transmitting a request signal for requesting authentication information to the printing apparatus via the communication unit;
receiving the authentication information via the communication unit;
in a case where the authentication information is received, generating an authentication code based on the authentication information;
requesting use of the predetermined function provided by the printing apparatus using the authentication code, via the communication unit without accepting the authentication code for the use of the predetermined function from a user;
generating a print job used for printing executed by the printing apparatus; and
transmitting the print job to the printing apparatus via the communication unit that is used to transmit the request signal and that is used to receive the authentication information.

13. The control method according to claim 12,
wherein a screen for prompting the predetermined operation in the printing apparatus is displayed, in response to transmission of the request signal.

14. The control method according to claim 13,
wherein a first screen is displayed when prompting a first predetermined operation, and a second screen different from the first screen is displayed when prompting a second predetermined operation different from the first predetermined operation.

15. The control method according to claim 12,
wherein the printing apparatus includes a button for accepting the predetermined operation, and
the predetermined operation is an operation of pressing the button.

16. The control method according to claim 12,
wherein the predetermined function is a remote UI function for displaying a management screen for managing the printing apparatus,
information regarding the management screen is received via the communication unit by requesting use of the remote UI, and
the management screen is displayed based on the information regarding the management screen.

17. The control method according to claim 12, further comprising:
acquiring other authentication information via the communication unit in a case where the authentication information was received,
wherein use of the predetermined function is requested using the authentication code generated based on the authentication information and the other authentication information, and
the printing apparatus permits execution of the predetermined function based on the requesting unit requesting use of the predetermined function.

18. The control method according to claim 12,
wherein communication performed by the communication unit is communication based on Wi-Fi.

* * * * *